(12) United States Patent
Herb

(10) Patent No.: US 7,101,131 B2
(45) Date of Patent: Sep. 5, 2006

(54) ATTACHMENT SYSTEM

(75) Inventor: Armin Herb, Apfeldorf (DE)

(73) Assignee: Hilti Aktiengesellschaft, Schaan (LI)

( * ) Notice: Subject to any disclaimer, the term of this patent is extended or adjusted under 35 U.S.C. 154(b) by 110 days.

(21) Appl. No.: 10/728,254

(22) Filed: Dec. 4, 2003

(65) Prior Publication Data

US 2004/0165943 A1   Aug. 26, 2004

(30) Foreign Application Priority Data

Dec. 5, 2002   (DE) ................ 102 56 861

(51) Int. Cl.
*F16B 27/00* (2006.01)
(52) U.S. Cl. ...................................................... 411/84
(58) Field of Classification Search ................ 411/253, 411/254, 84, 85, 265–270
See application file for complete search history.

(56) References Cited

U.S. PATENT DOCUMENTS

| | | | | |
|---|---|---|---|---|
| 242,074 A * | 5/1881 | Theobald | ...................... | 411/267 |
| 744,559 A * | 11/1903 | Kendrick | ..................... | 409/225 |
| 892,972 A * | 7/1908 | Bryce | .......................... | 411/267 |
| 894,875 A * | 8/1908 | Bryce | .......................... | 411/267 |
| 897,168 A * | 8/1908 | Smith | .......................... | 411/222 |
| 1,066,414 A * | 7/1913 | Gendre et al. | ............... | 251/361 |
| 1,142,464 A * | 6/1915 | Sparks | ........................ | 411/228 |
| 1,293,180 A * | 2/1919 | Pace | ........................... | 411/237 |
| 1,344,544 A * | 6/1920 | Lorenz | ....................... | 411/259 |
| 2,264,561 A * | 12/1941 | Bergmann et al. | ........... | 411/268 |
| 2,377,891 A * | 6/1945 | Ernest | ......................... | 285/342 |
| 2,633,175 A * | 3/1953 | Edmond-Pierre | ............. | 411/85 |
| 3,599,693 A * | 8/1971 | Bucheli | ....................... | 411/108 |
| 3,653,691 A * | 4/1972 | Bram | .......................... | 285/236 |
| 4,030,741 A * | 6/1977 | Fidrych | .................... | 285/149.1 |
| 4,145,075 A * | 3/1979 | Holzmann | ..................... | 285/81 |
| 4,250,348 A * | 2/1981 | Kitagawa | ................. | 174/65 SS |
| 4,285,379 A * | 8/1981 | Kowalski | ...................... | 411/85 |
| 4,358,079 A * | 11/1982 | Navarro | ....................... | 248/56 |
| 4,410,298 A * | 10/1983 | Kowalski | ..................... | 411/112 |
| 4,460,299 A * | 7/1984 | Kowalski | ...................... | 411/85 |
| 4,645,393 A * | 2/1987 | Pletcher | ....................... | 411/84 |
| 4,666,355 A * | 5/1987 | Stover | .......................... | 411/85 |
| 4,738,636 A * | 4/1988 | Bolante | ....................... | 439/462 |
| 4,930,961 A * | 6/1990 | Weis | .......................... | 411/266 |
| 5,104,273 A * | 4/1992 | Clark | ........................... | 411/85 |
| 5,211,576 A * | 5/1993 | Tonkiss et al. | ............. | 439/462 |
| 5,271,586 A * | 12/1993 | Schmidt | ....................... | 248/58 |
| 5,405,172 A * | 4/1995 | Mullen, Jr. | ................... | 285/92 |
| 5,489,173 A * | 2/1996 | Hofle | .......................... | 411/85 |
| RE35,479 E * | 3/1997 | Witherbee et al. | ............ | 248/49 |
| 5,628,598 A * | 5/1997 | Hofle | .......................... | 411/85 |
| 5,655,865 A * | 8/1997 | Plank et al. | .................. | 411/85 |
| 5,769,365 A * | 6/1998 | Onishi et al. | .................. | 248/49 |

(Continued)

*Primary Examiner*—Robert J. Sandy
*Assistant Examiner*—Jeffrey A. Shap
(74) *Attorney, Agent, or Firm*—Abelman, Frayne & Schwab

(57) ABSTRACT

An attachment system for securing a rod member in a mounting opening of a constructional component (44; 74; 97) includes a receiving sleeve (5; 37; 64; 73; 93) for receiving the rod member (23; 40), and an actuation member (4; 35; 62; 72; 81; 92) connected with the receiving sleeve (5; 37; 64; 73; 93) for substantially radially displacing the engagement elements (24.1; 24.2; 49.1; 49.1; 69.1; 69.2; 98.1; 98.2) of the receiving sleeve, which engage the rod member, from a first position in which the rod member is received in the receiving sleeve (5; 37; 64; 73; 93) to a second position in which the rod member is locked in the receiving sleeve.

10 Claims, 8 Drawing Sheets

U.S. PATENT DOCUMENTS

| | | | | |
|---|---|---|---|---|
| 5,866,853 A * | 2/1999 | Sheehan | ................. | 174/65 SS |
| 6,244,806 B1 * | 6/2001 | Kato | ........................ | 411/265 |
| 6,284,973 B1 * | 9/2001 | Daoud | ..................... | 174/65 R |
| 6,290,426 B1 * | 9/2001 | van Gijsel et al. | ....... | 403/374.3 |
| 6,305,889 B1 * | 10/2001 | Blessing et al. | ............ | 411/353 |
| 6,350,955 B1 * | 2/2002 | Daoud | ..................... | 174/65 R |
| 6,386,809 B1 * | 5/2002 | Ikuta | ......................... | 411/340 |
| 6,447,200 B1 * | 9/2002 | Hungerford, III | ........ | 403/374.1 |
| 6,448,496 B1 * | 9/2002 | Daoud | ..................... | 174/65 R |
| 6,488,317 B1 * | 12/2002 | Daoud | ....................... | 285/322 |
| 6,632,058 B1 * | 10/2003 | Hoffmann et al. | .......... | 411/433 |
| 6,652,209 B1 * | 11/2003 | Hoffmann | .................. | 411/438 |
| 6,854,944 B1 * | 2/2005 | Hoffmann et al. | .......... | 411/433 |
| 6,890,006 B1 * | 5/2005 | Crestin et al. | .............. | 285/342 |
| 2002/0048497 A1 * | 4/2002 | Herb | ........................... | 411/85 |
| 2002/0048499 A1 * | 4/2002 | Hoffmann | .................. | 411/432 |
| 2002/0054788 A1 * | 5/2002 | Hoffmann | .................. | 403/403 |
| 2002/0071735 A1 * | 6/2002 | Dinh et al. | .................... | 411/85 |
| 2002/0098057 A1 * | 7/2002 | Hoffmann et al. | .......... | 411/344 |
| 2002/0110435 A1 * | 8/2002 | Herb et al. | ................... | 411/84 |
| 2003/0175094 A1 * | 9/2003 | Hoffmann et al. | .......... | 411/433 |
| 2003/0185643 A1 * | 10/2003 | Thompson | ................... | 411/85 |
| 2003/0198530 A1 * | 10/2003 | Hoffmann et al. | ............ | 411/84 |
| 2004/0165947 A1 * | 8/2004 | Herb | ....................... | 403/374.3 |
| 2004/0165964 A1 * | 8/2004 | Herb | ........................... | 411/84 |
| 2004/0165965 A1 * | 8/2004 | Unverzagt et al. | ............ | 411/84 |
| 2004/0228681 A1 * | 11/2004 | Herb | ......................... | 403/348 |

* cited by examiner

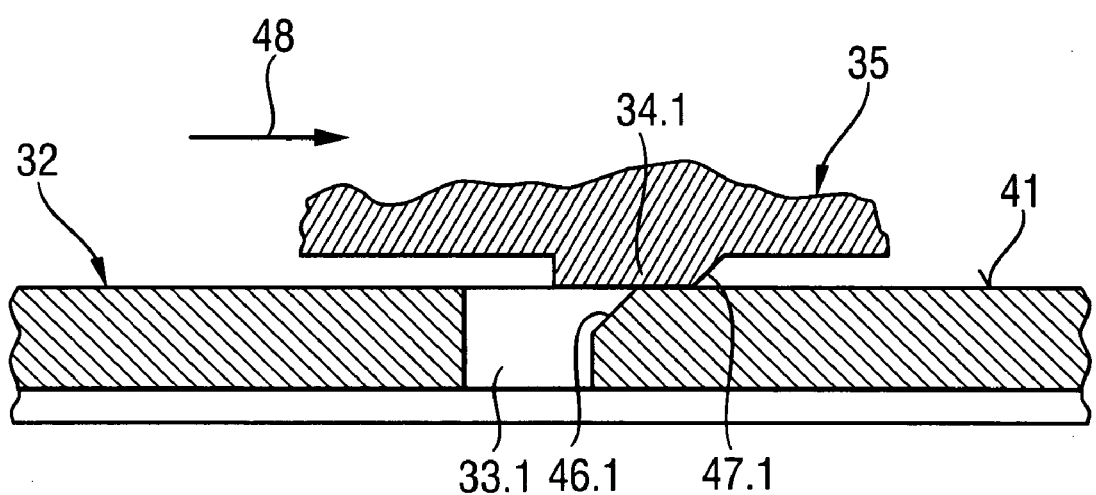

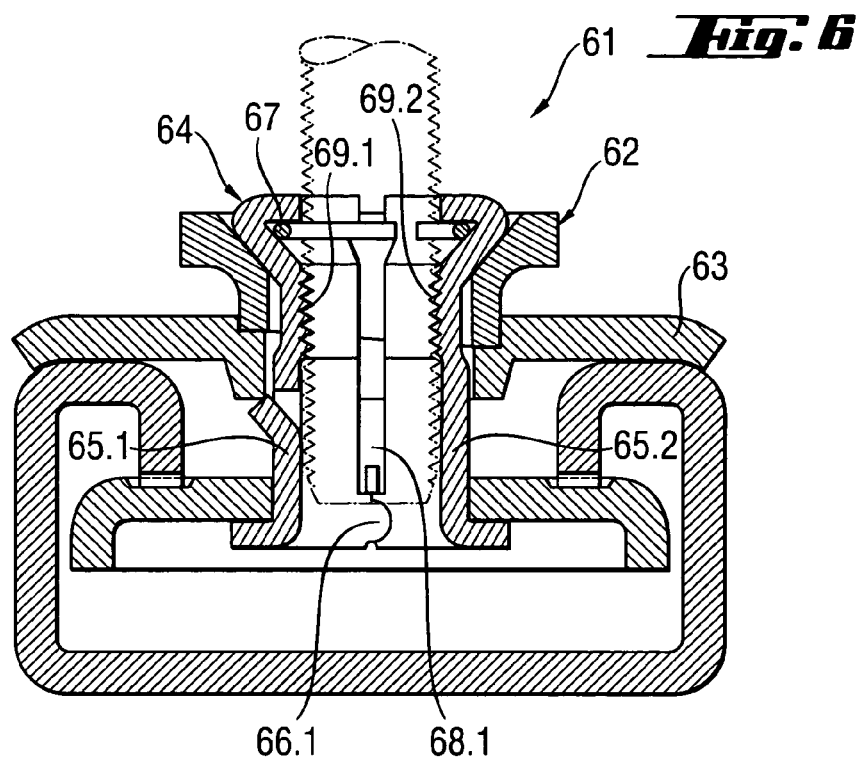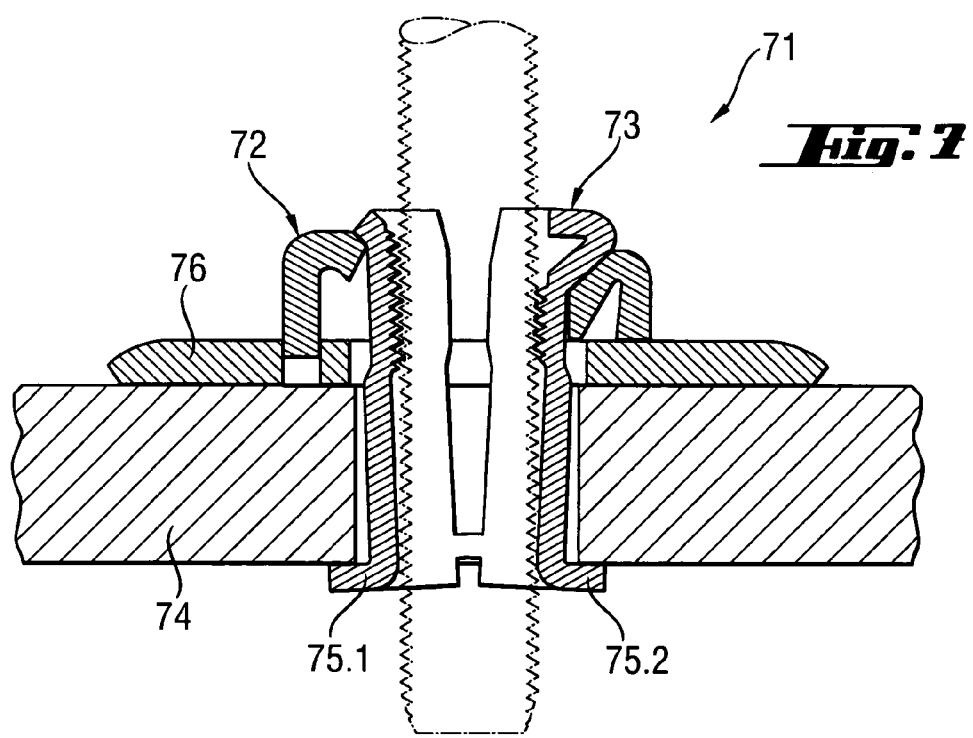

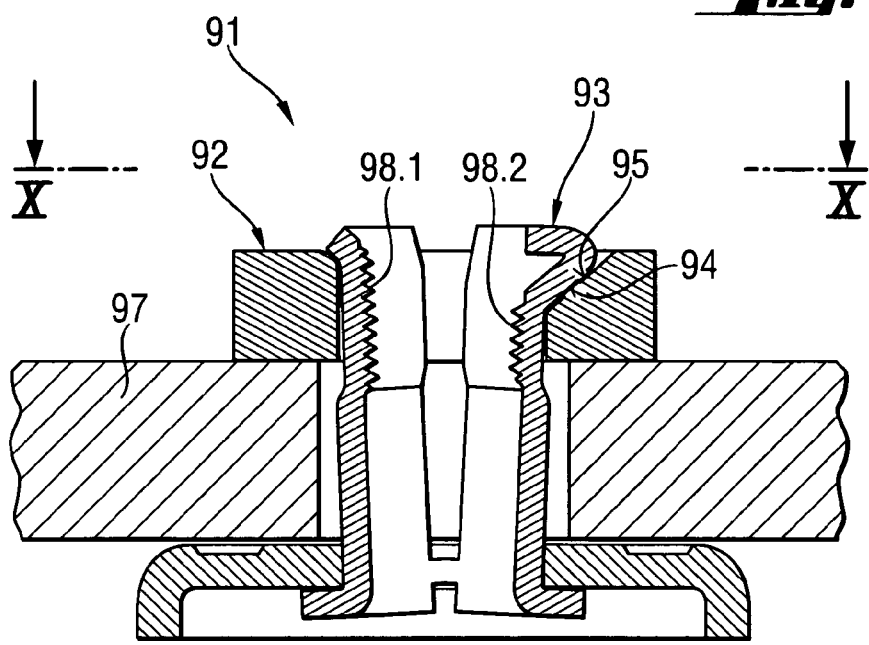
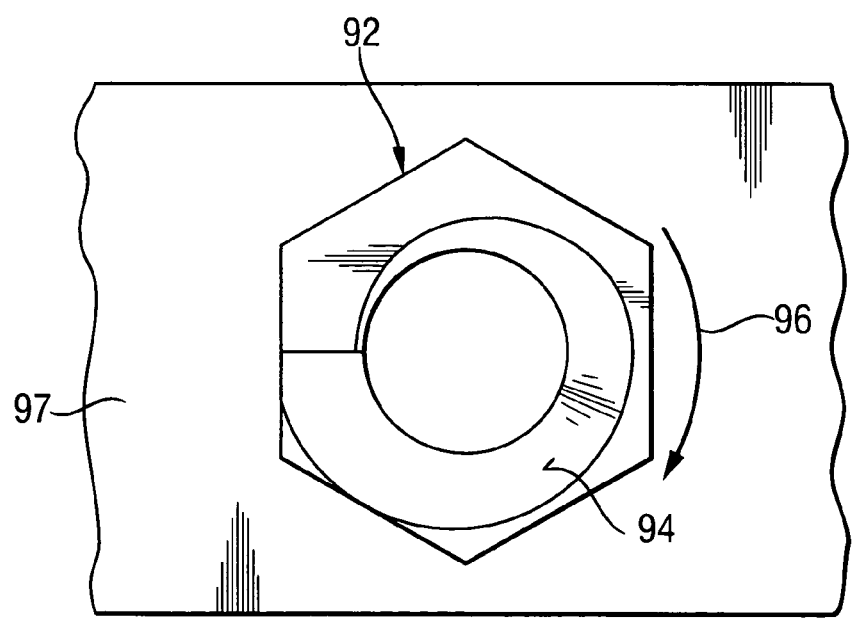

ATTACHMENT SYSTEM

BACKGROUND OF THE INVENTION

1. Field of the Invention

The present invention relates to an attachment system for securing a rod member in a mounting opening of a constructional component, in particular, for securing a threaded rod in a mounting opening of a hollow body, and including a receiving sleeve for receiving the rod member and having engagement means for engaging the rod member.

2. Description of the Prior Art

Attachment systems of the type described above are used, e.g., in suspending devices for conduit installations such as tubular conduits and the like, for attachment to so-called mounting rails. A threaded rod with a pipe clip and, if necessary, with a tubular conduit already mounted in the clip is prepositioned with the attachment system on a mounting rail. Then, the threaded rod is height-adjusted and is secured with a rail nut and/or lock nut. The end attachment should be backlash-free so that the attachment system can withstand high loads.

The drawback of the attachment system, with which clamping is used, consists in that during the clamping process, an axial displacement of the to-be-clamped parts, e.g., of the threaded rod takes place. As a result of the axial displacement, no precise height adjustment of the aligned rod member is possible and, therefore, of the conduit that is attached thereto.

Accordingly, an object of the present invention is to provide an attachment system for rod members and that would enable a precise adjustment of the rod member, while insuring a high load level of the attachment.

SUMMARY OF THE INVENTION

This and other objects of the present invention, which will become apparent hereinafter, are achieved by providing an attachment system for securing a rod member in a mounting opening of a constructional component, in particular, for securing a threaded rod in a mounting opening of a hollow body and including a receiving sleeve for receiving the rod member and having engagement means for engaging the rod member, and an actuation member connected with the receiving sleeve for substantially radially displacing the engagement means from a first position in which the rod member is received in the receiving sleeve, to a second position in which the rod member is locked in the receiving sleeve.

The inventive attachment system is introduced in a mounting opening of a constructional component.

The constructional component can represent a constructional part of a steel construction, a wooden construction, a concrete construction, and be formed as plate, wall, carrier, and the like. The rod member is inserted into the receiving sleeve with a rough adjustment. By actuation of the actuation member, the engagement means of the receiving sleeve are displaced from its first position to is second position, prefixing the rod member with the engagement means which engages the rod member. With the essentially radial displacement of the engagement means from the first position to the second position, no axial displacement of the rod member takes place when the rod member is secured with the inventive attachment system.

The engagement means can be formed as projections on the receiving sleeve and which clampingly lock the rod member in the second position. The engagement means can be formed as a single projection and a flat surface both provided on the receiving sleeve and cooperating with each other. When the rod member has a smooth surface, at least one of the engagement elements of the engagement means has a coating, e.g., a coating on a rubber compound base. With this, the friction between the receiving sleeve and the rod member increases, which improves resistance against the displacement of the rod member over its axis under load. When e.g., a threaded rod is secured in the attachment system, the engagement means is also formed as a thread or at least as a threaded section that engages in the threaded rod upon locking of the attachment system.

For leveling, e.g., of a tubular conduit, which is secured on the rod member, the actuation member is displaced in a direction opposite the initial displacement direction, whereby the engagement between the receiving sleeve and the rod member is released. The tubular conduit is aligned, and the height-adjusted rod member is secured in the predetermined position by a new displacement of the actuation member in the initial direction. Because the engagement means is not displaced in the axial direction during the locking process, the rod member is also not displaced axially relative to the constructional component, and the effected adjustment of the rod member is retained when the receiving sleeve or its engagement means is displaced from the first position to the second position.

Upon release of the actuation member, not only the engagement between the engagement means of the receiving sleeve and the rod member is released, but also the clamping action between the attachment system and the constructional component, to which the attachment system is clamped, is also released. When the mounting opening of the constructional component has a certain length, after the release or the unlocking of the attachment system, not only the rod member can be height-adjusted, but the entire attachment system can be repositioned along the longitudinal axis of the mounting opening. Upon locking of the actuation member, in addition to the rod member, the entire attachment system is again secured to the constructional component.

Advantageously, the receiving sleeve has at least one adjusting surface and the actuation member has at least one actuation surface engageable with the at least one adjusting surface for inducing a substantially radial displacement of the engagement means of the receiving sleeve from the first position to the second position. Preferably, the actuation surface extends over the circumference of the actuation member to a most possible extent. The actuation surface can, e.g. be formed with a small ascent, so that high locking forces are applied to the rod member received in the receiving sleeve. This provides for a reliable attachment of the rod member to the attachment system with a small displacement of the actuation member.

Preferably, the actuation member is displaced parallel to the longitudinal axis of the receiving sleeve. The engagement means of the receiving sleeve which, preferably, is retained from an axial displacement to a most possible extent, is displaced by the axially displaceable actuation member radially from the first position to the second position. This results in displacement from one position to another, without an axial displacement of the receiving sleeve, and insures locking of the rod member, without the rod member being displaced axially.

Advantageously, the inventive attachment system is used with constructional components formed as a C-shaped mounting rail. The mounting rail is secured to a construction base, e.g., with one of its side surfaces. The attachment system can be introduced into the mounting opening to a certain position. Then, the attachment system is repositioned along the longitudinal axis of the mounting opening to a predetermined position and is secured in this position to the mounting rail upon actuation of the actuation member.

Preferably, the attachment system includes a rear engagement member displaceable through the mounting opening of the constructional component for engaging the constructional component from behind or, optionally, for engaging holding elements provided on the constructional component. Advantageously, the rear engagement member has an extent in one direction smaller than the width of the mounting opening to enable introduction of the attachment system through the mounting opening. In the direction transverse to the one direction, the extent of the rear engagement member is greater than the width of the mounting opening, and the rear engagement member, after being introduced through the mounting opening, is pivoted by a predetermined angle, preferably, 90°, so that it can engage from behind at least one edge region of the mounting opening or engage the constructional component itself. When the attachment system is secured to a C-shaped mounting rail, the rear engagement member engages, advantageously, holding projections provided in the interior of the mounting rail. In the engagement region between the rear engagement member and the constructional component, special engagement means, e.g., knurling can be provided. The knurling is provided on the rear engagement member and/or on the engageable region of the constructional component. The rear engagement member is, advantageously, formlockingly or forcelockingly connected with the receiving sleeve, e.g., with a sealing lacquer or dot soldering.

Advantageously, the receiving sleeve has, at its end facing in a setting direction of the rod member, at least one holding element for engaging from behind the constructional component and/or the rear engagement member. The at least one holding element can be formed, e.g., on the outer circumference of the receiving sleeve as an outwardly extending projection. The projection can have a shape, e.g., of a flange section that engages from behind at least a section of an edge or edges of the mounting opening. Advantageously, there are provided two, diametrically opposite, flange sections that are introduced into the mounting opening and, after the pivotal movement of the receiving sleeve by a predetermined angle, e.g. 90°, can engage the edge or edges of the mounting opening. Functionally, the holding sections of the receiving sleeve are substantially similar to the rear engagement member.

Advantageously, the attachment system includes a stop that engages the end surface of the constructional component, in particular, the edges of the outer side of the hollow body which limit the mounting opening. The stop can be provided, in its contact area with the actuation member, with a coating to insure actuality of the actuation member. E.g., the stop can be provided in this contact area with a Teflon coating. When the attachment system is arranged in a C-shaped mounting rail, the combination of the stop and the rear engagement member insures a necessary spacing of the rear engagement member from the outer edge of the constructional component. This permits to introduce the rear engagement member through the mounting opening and pivot it in the interior of the mounting rail. To this end, the receiving sleeve is pivotally supported within the stop.

For a reliable engagement and a simultaneous fixation of the to-be-locked rod member, the mounting of the attachment system is effected in two stages. In the first stage, the attachment system is introduced into the mounting opening of the mounting rail and then, e.g., is pivoted by 90°. The distance between the stop and the rear engagement member amount at that stage to somewhat more than the extent of the edges of the mounting opening in the axial direction of the receiving sleeve. Then, the actuation member is actuated until the rear engagement member engages the holding projection provided in the mounting rail. In the next states, the rod member is introduced into the attachment system, is height-adjusted and is secured by a new actuation of the actuation member. By actuation of the actuation member in a direction opposite the initial direction, the rod member and the attachment system are released. In order to insure an easy introduction of the rod member, in particular when a clearance between the engagement means of the receiving sleeve, which is in the first, receiving position, an the rod member is small, the rod member can be introduced into the receiving sleeve before the rear engagement member is locked with the constructional component. The mounting and fixation of the rod member is simplified by the fact that the actuation member needs not be actuated several times.

Advantageously, to provide for its axial displacement, the actuation member is provided with a thread that, optionally, can cooperate with a thread provided on the stop. With the thread, upon actuation of the actuation member, a controlled axial displacement of the actuation member takes place. The amount of the displacement is determined by the thread pitch. The thread of the actuation member cooperates, e.g., with a thread provided on the constructional component. When the inventive attachment system includes a stop, as discussed above, it can be provided with a thread with which the thread of the actuation member cooperates. E.g., the actuation member can have an outer thread that cooperates with an inner thread of a stop. The threads can be formed as lefthand or righthand thread and as a metric or inch thread. E.g., on the constructional component or the stop, instead of circumferential thread, only a thread section can be provided in which the thread of the actuation member engages. In this case, advantageously, there are provided at least two, preferably three, thread sections uniformly radially distributed.

According to an advantageously embodiment of the present invention, the actuation member has a curved profile which can cooperate, optionally, with a curved profile provided on the stop. The curved profile insures a controlled axial displacement of the actuation member upon its actuation. The shape of the curved profile determines, e.g., the height and the course of the axial displacement. The curved profile of the actuation member slides, e.g., over the surface of the constructional component or engages a curved profile provided on the constructional component. If the attachment system includes a stop, the curved profile is, advantageously, provided on the stop, with the curved profile of the actuation member cooperating with the stop curved profile.

The curved profile can be formed as toothing, with separate intervening elements being provided with different inclinations. The length of the displacement path for effecting locking, e.g., for displacement of the engagement means of the receiving sleeve from the first position to the second position, is determined by the inclination angle. For compensation of the thread tolerances between the rod member, when it is formed as a threaded rod, and the engagement means of the receiving sleeve and for locking of the rod member, a flatter inclination adjoins a more steep inclination. With a flatter inclination, the necessary clamping force is applied, and a self-release of the clamping connection is prevented by self-locking of the connection.

According to an alternative embodiment of the present invention, the curved profile is formed by cams which engage in indentations and/or recesses and which are withdrawn from the recesses and/or indentations upon actuation of the actuation member. After being withdrawn, the cams slides over a corresponding surface of the constructional component or of the stop. When, e.g., the cams are provided in the actuation member, the constructional component or stop is provided with complementary indentations and/or recesses. The indentation and/or recesses have, preferably, inclinations in the displacement direction of the actuation member which facilitate sliding of the cams out of the indentations and/or recesses upon actuation of the actuation member. In this way, with this embodiment of the curved profile, an axial displacement of the actuation member takes place upon its actuation, and the engagement means is displaced from the first position to the second position.

Advantageously, the adjusting surface of the receiving sleeve and/or the actuation surface of the actuation member is formed as an ascending surface and/or sloping surface and, optionally, as a spiral surface. The advantage of ascending or sloping surface consists in that the inclination can be varied along its extent. E.g., the adjusting surface of the receiving sleeve can have a predetermined inclination and be formed in a region of the receiving sleeve. The actuation member, e.g., can have an actuation surface that engages the adjusting surface or covers it. The actuation surface can have, at its beginning, a greater inclination which provides for engagement of the engagement means of the receiving sleeve with the rod member at a smaller displacement of the actuation member. A surface with a smaller inclination can adjoin the surface with a grater inclination of the actuation member. The surface with a smaller inclination provides for securing of the rod member by the attachment system. The ascending and/or sloping is preferably formed with a continuously varying inclination, with the surface having a spiral shape.

Advantageously, the adjusting surface and/or the actuation surface includes an inclined surface. Optionally, both the adjusting surface of the receiving sleeve and the actuation surface are formed as inclined surfaces complementary to each other for converting an axial displacement of the actuation member in the substantially radial displacement of the engagement means of the receiving sleeve. The actuation surface can, e.g., have shape of an inner cone that cooperates, upon actuation of the actuation member, with the adjusting surface of the receiving sleeve and which can have a shape of an outer cone. In this case, upon actuation of the actuation member, the inner cone is displaced over the adjusting surface-forming outer cone, and the engagement means of the receiving sleeve is displaced from the first position to the second position as a result of the axial displacement of the actuation member.

Preferably, torque transmitting means is provided on the actuation member, with the actuation member, optionally, being arranged outside of the receiving sleeve. The torque transmitting means can have its outer profile formed similar to a hexagonal nut and can be handled with a conventional wrench. The actuation of the actuation member with a wrench provides the user with a feeling that he is in complete control.

Advantageously, the receiving sleeve is formed as a one-piece part and includes at least one slot extending in an insertion direction of the attachment system and at least one springy web. Optionally, the receiving sleeve has spring means for retaining the receiving sleeve in the first position of the engaging means. Advantageously, the receiving sleeve is provided with two, diametrically opposite slots and two springy webs. In addition, at the end of the receiving sleeve facing in a direction opposite to the insertion direction, a split washer can be provided for retaining the engagement means of the receiving sleeve in the first, rod member-receiving position. This embodiment is particularly advantageous when the attachment system has to be opened and closed several times for repositioning of the attachment system on the constructional component or of the rod member in the attachment system. With each release or opening of the attachment system, the engagement means of the receiving sleeve is displaced from the second position to the first position as a result of the biasing action of the split washer.

Instead of providing of the springy web at the end of the receiving sleeve facing in the insertion direction of the attachment system, the web can be provided in the middle region of the longitudinal extent of the receiving sleeve. With this shape, the receiving sleeve can be formed, in the insertion direction of the attachment system, as a wedge-shaped part. The attachment system is introduced in the mounting opening of the constructional component with the receiving sleeve which is provided with at least one, extending outwardly, projections. When a rod member is inserted into the receiving sleeve, the receiving sleeve expands so that the at least one projection engages, from behind, at least one region of the edge of the mounting opening of the constructional component. Upon actuation of the actuation member, the receiving sleeve or the at least one projection is clamped to the constructional component.

According to the present invention, alternatively to a one-piece receiving sleeve, the receiving sleeve can be formed of several parts, with spring means connecting the separate parts together, and with parts being spaced from each other to form at least one slot. Advantageously, the receiving sleeve is formed of two parts or sections connected with two, spaced from each other, spring elements. One of the spring elements, advantageously, is provided at the end of the receiving sleeve facing in the insertion direction and surrounds the sleeve from outside, with another of the spring element being provided at the opposite end of the receiving sleeve inwardly thereof for retaining the engagement means of the receiving sleeve in the first position. The spring elements can be formed, e.g., as split washer which are secured to respective portions of the receiving sleeve by soldering or welding. In order to provide springy webs between separate parts of a multi-part receiving sleeve, on at least one of two adjacent parts, there are provided, e.g., in the region of the insertion direction end of the receiving sleeve, clips connectable with the other of the adjacent parts by pressing, soldering, or gluing.

Advantageously, the stop and/or the rear engagement member has at least one locking element engageable with the at least one slot provided in the receiving sleeve for retaining elements of the attachment system together. This locking connection prevents receiving sleeve from rotation relative to other elements of the attachment system.

Advantageously, the elements of the attachment system are formed of sheet metal as a stamped and bent parts. Separate elements of the attachment system can be formed from an appropriate plastic material Further, for forming the elements of the attachment system, different material can be used in combination with each other. This permits to optimize production costs, technical requirements and the like by combining different material characteristics of different materials.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 4a plan view of the attachment system as seen along line IV—IV in FIG. 3a;

FIG. 5 a cross-sectional view along line V—V in FIG. 4a;

FIG. 6 a cross-sectional view of a third embodiment of an attachment system according to the present invention in its closed position;

FIG. 7 a cross-sectional view of a fourth embodiment of an attachment system according to the present invention in its open position;

FIG. 9 a cross-sectional view of a fifth embodiment of an attachment system according to the present invention in its open position; and FIG. 10 plan view of the attachment system as seen along line X—X in FIG. 9.

DETAILED DESCRIPTION OF THE PREFERRED EMBODIMENTS

Figure 1A:
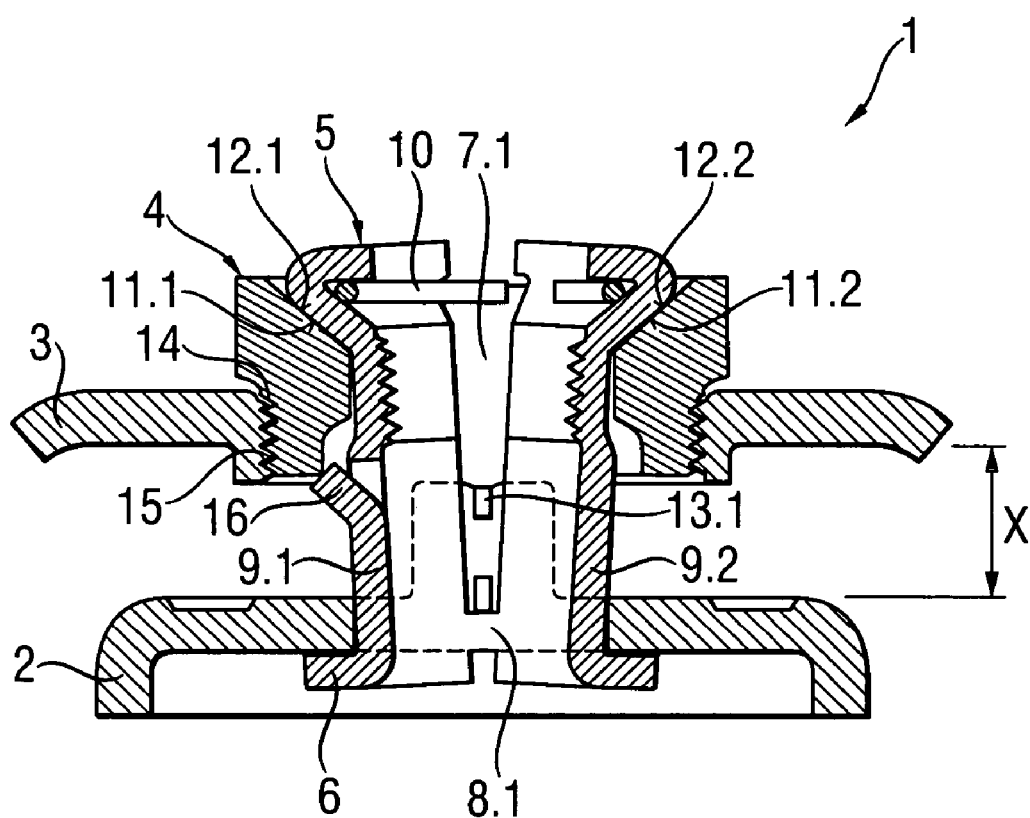
FIG. 1a a cross-sectional view of a first embodiment of an attachment system according to the present invention in its open position.

FIG. 1a, as discussed above, shows a first embodiment of an attachment system according to the present invention in its open position, i.e., in a position for receiving a rod member. In its setting direction, the inventive attachment system includes a rear engagement member 2 and a receiving sleeve 5 that engages the rear engagement member 2 from behind. At the end of the attachment system 1 remote from the rear engagement member 2, there are provided a stop 3 and an actuation member 4.

The receiving sleeve 5 ahs a flange 6 with which it engages the rear engagement member 2. The flange 6 is secured to the rear engagement member 2 with a sealing lacquer or a solder. The receiving sleeve 5 is formed as a one-piece part of a sheet metal and has two opposite slots 7.4 and 7.2 that extend from the end of the attachment system 1 remote from the rear engagement member 2 to an opposite end of the attachment system 1. At the end of the receiving sleeve 5 facing in the setting direction of the attachment system, there are provided two springy webs 8.1 and 8.2 (not shown in FIG. 1) which pivotally connect two sections 9.1 and 9.2 of the receiving sleeve 5. The rear engagement member 2 is provided with two cams 13.1 and 13.2 (see FIG. 2) which engage in respective slots 7.1 and 7.2, preventing rotation of the rear engagement member 2 and the receiving sleeve 5 relative to each other.

In order that the engagement means, the threaded sections 24.1 and 24.2 (see FIG. 1b) of the receiving sleeve 5 and, thus, the attachment system 1 remains, during transportation of the attachment system and before the positioning in a constructional component, in a first, so-called receiving position, in which the rod member can be received, the receiving sleeve 5 is bent inward at its end opposite the flange 6, forming a seat for a split washer 10. After release of the closed or locked attachment system 1, the split washer 10 insures expansion of the sleeve 5 for repositioning of the inserted rod member.

In the region of the split washer 10, the two sections 9.1 an 9.2 of the receiving sleeve 5 are expanded outwardly. As a result of the expansion, inclined portions 11.1 and 11.2 are formed on the sections 9.1 and 9.2, respectively. The inclined portions 11.1 and 11.2 form together an essentially conical section. The actuation member 4 has, at its side adjacent to the receiving sleeve 5, actuation surfaces 12.1 and 12.2 cooperating with the inclined portions 11.1 and 11.2, respectively. The surfaces 12.1 and 12.2 form together essentially an inner cone. The actuation member 4 has an outer thread 14 that cooperates with an inner thread 15 provided on the stop 3. On the receiving sleeve 5, a projection 16 is formed, e.g., with sheet shears or by stamping. The projection 16 locks the receiving sleeve 5 with the actuation member 4. Thereby, the rear engagement member 2 is retained at a distance X from the stop 3, which provides for insertion of the rear engagement member 2 through an opening in a mounting rail 21 (Fee FIG. 1b) and its rotation within the mounting rail 21.

Figure 1B:
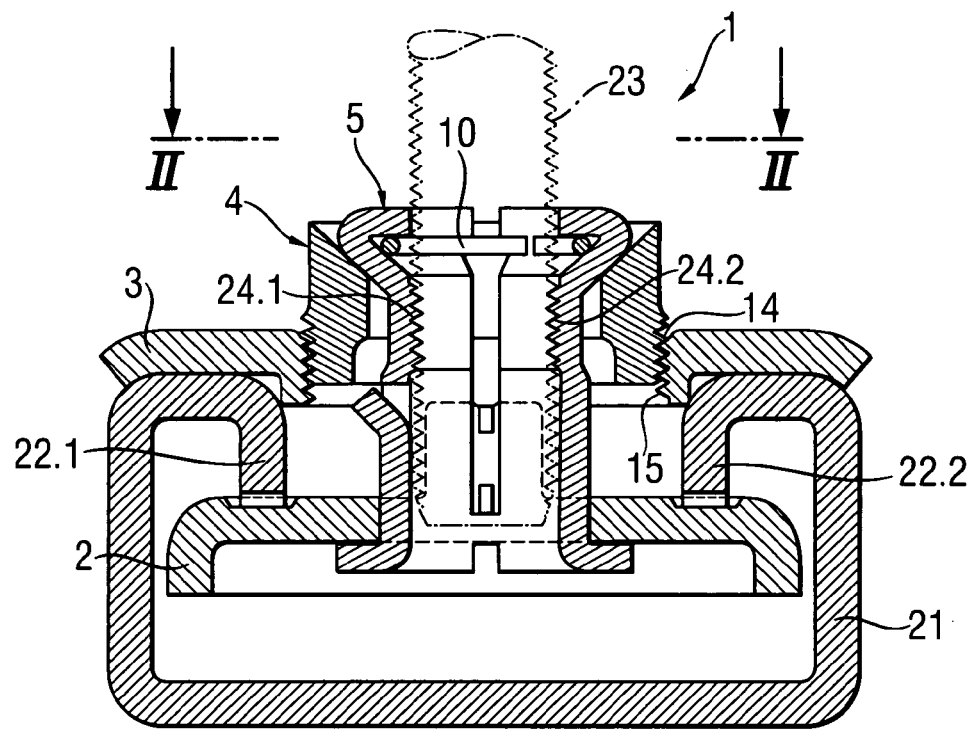
FIG. 1b a cross-sectional view of the attachment system shown in FIG. 1a in its closed position.

FIG. 1b shows the attachment system 1 in its closed or locked position. The attachment system 1 is introduced into the mounting rail 21 and is then rotated within the mounting rail 21 so that the rear engagement member 2 engages from behind holding projections 22.1 and 22.2 of the mounting rail 21. By rotating the actuation member 4 in a direction determined by the outer thread 14, e.g., leftwardly, the rear engagement member 2 is lifted by the receiving sleeve 5, which rotates together with the actuation member 4, until the rear engagement member 2 slightly engages the projections 22.1, 22.2. Before this step or by the time this step is initiated, a threaded rod 23 (shown with a dash-dot line) is inserted into the receiving sleeve 5 of the attachment system 1. After a further rotation of the actuation member 4, it is pulled up from the stop 3. As a result, on one hand, the rear engagement member 2 completely engages the holding projections 22.1, 22.2 of the mounting rail 21 and, on the other hand, the receiving sleeve 5 is displaced from its receiving position to its engagement position. The threaded sections 24.1 and 24.2 of the receiving sleeve 5 engage in the outer thread of the threaded rod 23.

For adjusting the threaded rod 23, the actuation member 23 is rotated in the opposite direction, rightwardly, and is lowered again into the stop 3. Upon unlocking of the attachment system 1 the receiving sleeve 5 is expanded by the split washer 10, in particular in the region of the threaded sections 24.1 and 24.2, which provides for repositioning of the threaded rod 23 along a longitudinal axis of the attachment system 1. As soon as a predetermined position of the threaded rod 23 is reached, the actuation member 4 is again rotated leftwardly. As a result, the receiving sleeve 5 is again lifted toward the stop 3, with the threaded sections 24.1 and 24.2 again engaging in the outer thread of the threaded rod 23, locking the same.

Figure 2:
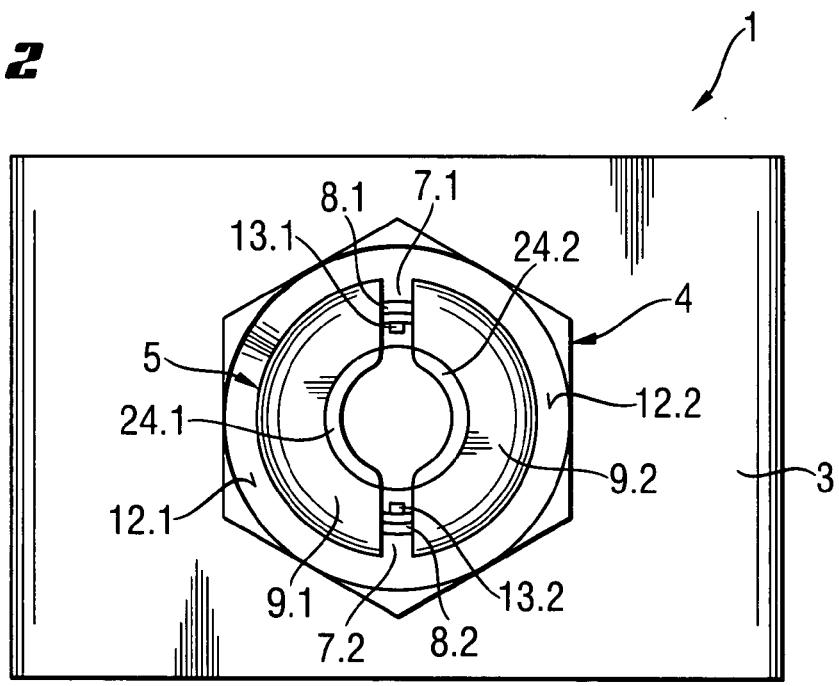
FIG. 2 plan view of the attachment system as seen along line II—II in FIG. 1b.

FIG. 2 shows a plan view of the attachment system 1 in its locking position. The actuation member 4 has a metric or inch hexagonal profile, which permits to actuate it with a conventional wrench.

Figure 3A:
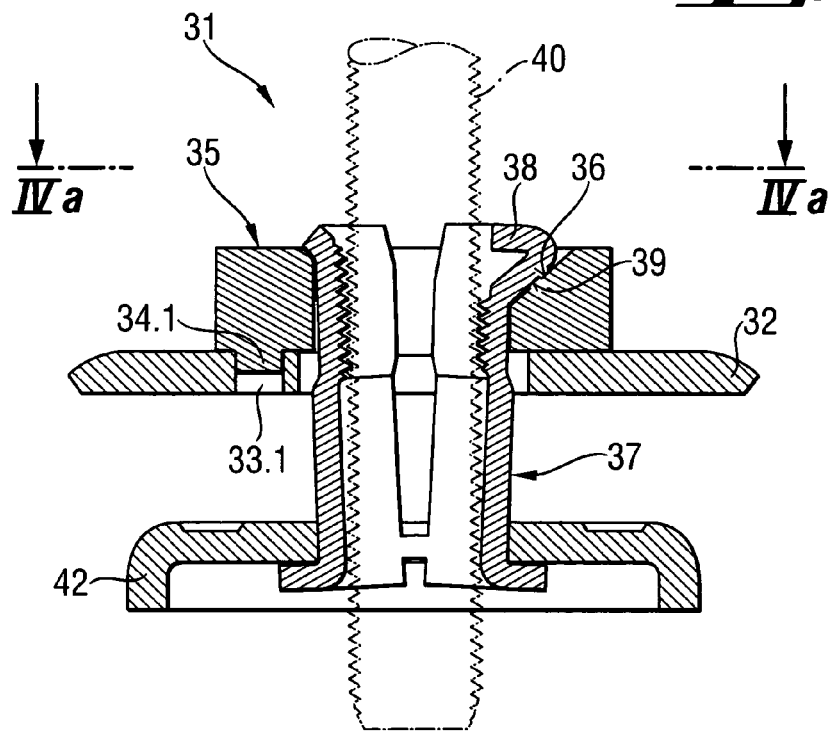
FIG. 3a a cross-sectional view of a second embodiment of an attachment system according to the present invention in its open position.

FIG. 3a shows a cross-sectional view of another embodiment of an attachment system according to the present invention in its open position. The attachment system 31 includes substantially the same element as the attachment system shown in FIGS. 1a and 1b. The attachment system of FIG. 3a differs from that of FIGS. 1a and 1b in that the stop 32 is provided with recesses 33.3 into which cams 34.1, 34.2 and 34.3, which are formed on the actuation member 35, respectively engage. The actuation member 35 has a spirally increasing actuation surface 36. The receiving sleeve 37 has its adjusting surface 39 formed by a relatively small region 38. The cooperation of the actuation surface 36 of the actuation member 35 with the adjusting surface 39 of the receiving sleeve 37 provides for displacement of the receiving sleeve 37 from a first position in which the threaded rod 40 (shown with a dash-dot line) is received, to a second position in which the threaded rod 40 is locked.

Figure 4A:
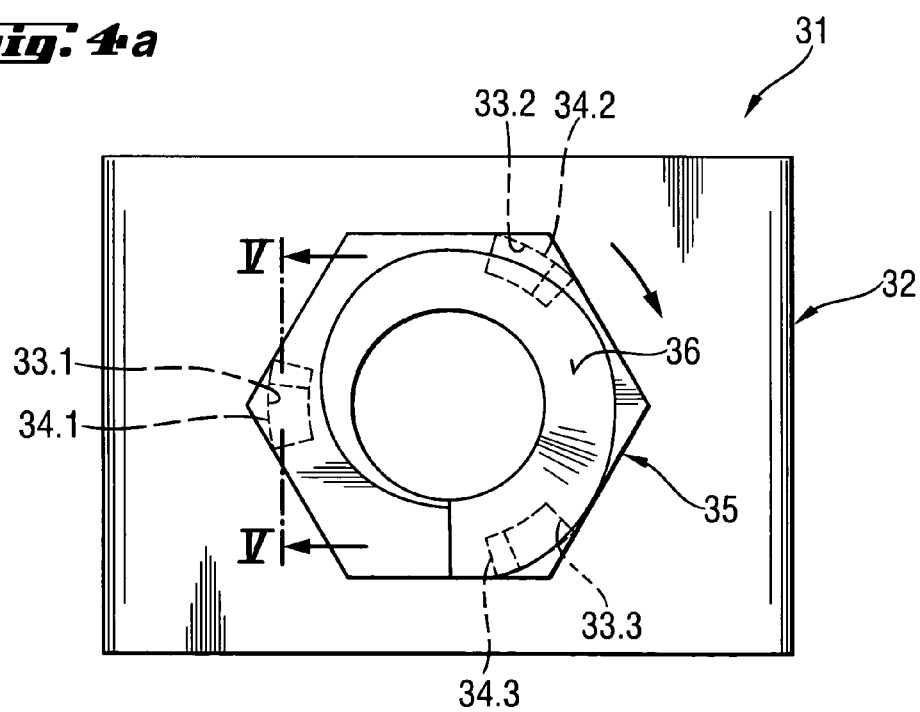

FIG. 4a shows a plan view of the attachment device shown in FIG. 3a. As shown in FIGS. 3a and 4a, in the first, receiving position of the attachment system 31, the cams 34.1, 34.2 and 34.3 of the actuation member 35 engage in respective recesses 33.1, 33.2 and 33.3 of the stop 32.

Figure 3B:
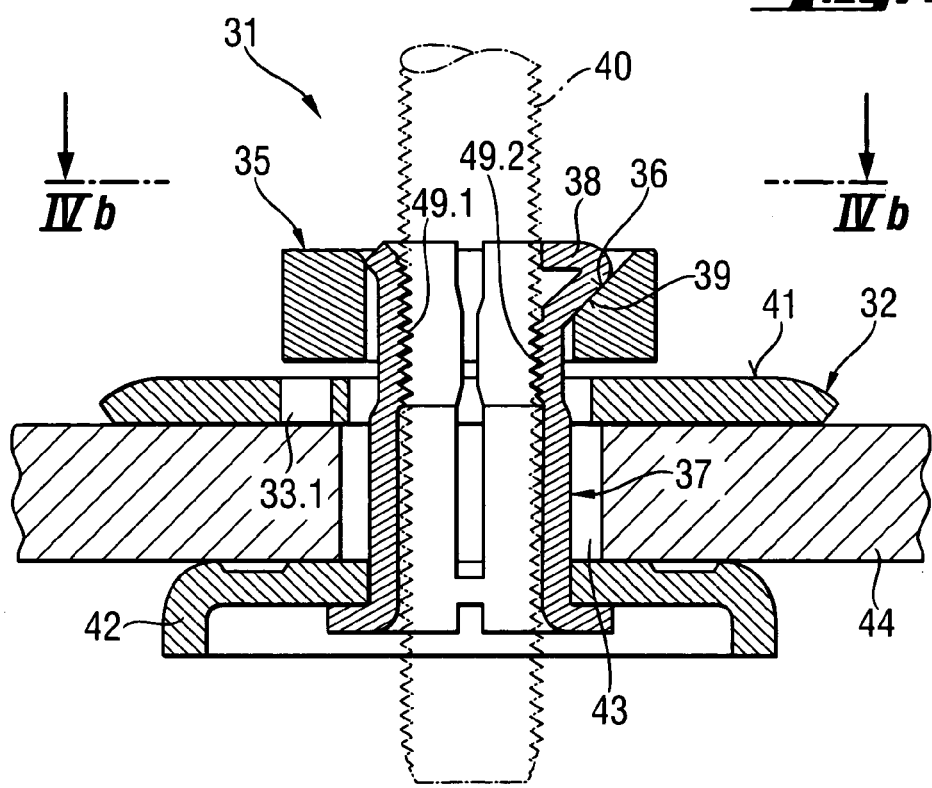
FIG. 3b A cross-sectional view of the attachment system shown in FIG. 3a in its closed position.

FIG. 3b shows the attachment system 31 in its closed or locking position. As a result of rotation of the actuation member 35, e.g., rightwardly, the cams 34.1, 34.2 and 34.3 are pulled up from the recesses 33.1, 33.2 and 33.3 and slide over the surface 41 of the stop 32, and the actuation member 35 is lifted off the stop 35. As a result, on one hand, an engagement member 42, which was introduced through a mounting opening 43 of the plate 44 and which was rotated relative to the stop 32, is locked to the plate 44 and, on the other hand, the threaded sections 49.1 and 49.2 of the receiving sleeve 37 are displaced from the receiving sleeve first position to the sleeve second position, in which the threaded rod 40 is locked.

Figure 4B:
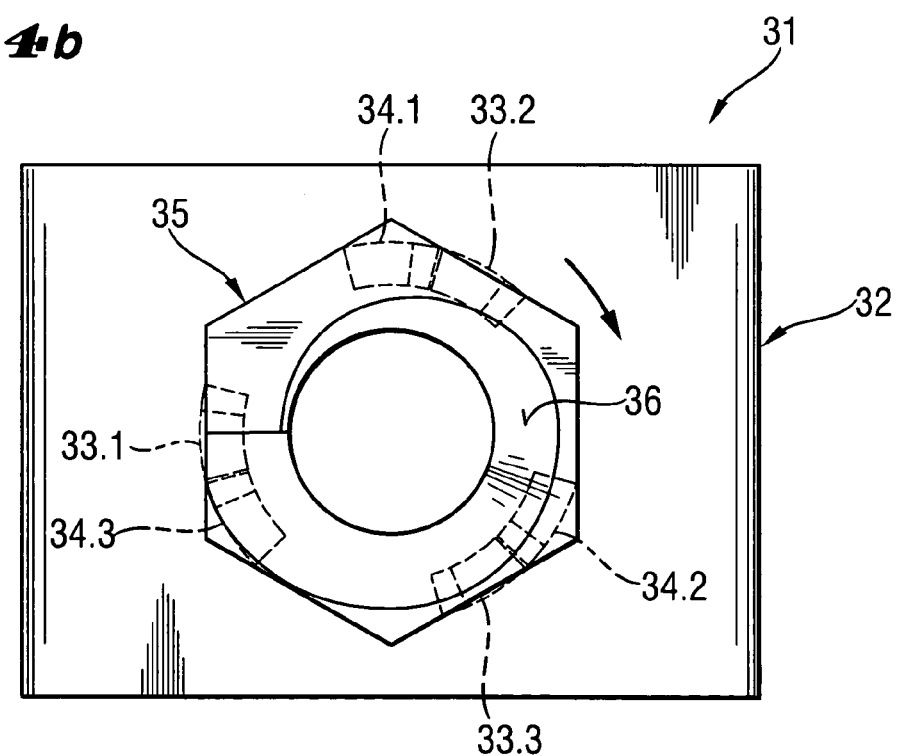
FIG. 4b plan view of the attachment system as seen along line IV—IV in FIG. 3b.

FIG. 4b shows a plan view of the attachment system 31 in its closed position. In this view, the cams 34.1, 34.2 and 34.3, which are offset with respect to the recesses 33.1, 33.2 and 33.3, are shown with dash lines. The relative positions of other elements of the attachment system 31 in its closed position are shown in FIG. 4a.

FIG. 5 shows in more detail cooperation of the cams 34.1, 34.2 and 34.2 of the actuation member 35 with the recesses 33.1, 33.2 and 33.3 of the stop 32 by example of cooperation of the cam 34.1 with the recess 33.1. In order to make the release of engagement of the cam 34.1 with the recess 33.1 easier upon actuation of the actuation member 35, the recess 33.1 is provided with an inclined surface 46.1, and the cam 34.1 has a ramp-shaped inclination 47.1 complementary to the inclined surface 46.1. Upon rotation of the actuation member 35 in the direction of arrow 48, the cam 34.1 slides out of the recess 33.1 and abuts the upper surface 41 of the stop 32.

FIG. 6 shows a cross-sectional view of a third embodiment of the attachment system 61 according to the present invention in its closed or locking position. An actuation member 62 of the attachment system 61 has a curved profile that engages in a complementary curved profile provided on a stop 63. Upon actuation of the actuation member 62, it slides over the stop 63 and is lifted off the stop 63, and due to the engagement of the receiving sleeve 64 with the actuation member 62, the threaded section 69.1 and 69.2 of the receiving sleeve 64 are displaced from their first, open position into their second, locking position.

The receiving sleeve 64, which is shown in FIG. 6, is formed of two sections 65.1 and 65.2. The sections 65.1 and 65.2 are resiliently connected with each other at their ends facing in the setting direction of the attachment system, with overlapping sections 66.1 and 66.2 which are soldered with each other. The separate sections 65.1 and 65.2 of the receiving sleeve 64 are connected with at least one spring element and are spaced from each other to form at least one slot 68.1. At the end of the receiving sleeve 64 remote from the overlapping sections 66.1, 66.2, there is provided a split washer 67 for retaining the engagement means, e.g., threaded sections of the receiving sleeve 64 in their first, open or receiving position.

A further embodiment of an attachment system according to the present invention is shown in FIG. 7. The attachment system 71, which is shown in FIG. 7, is formed of easily manufacturable sheet elements and is an economical alternative to the systems described previously. The actuation member 72 has cam means that engage in the stop 76 in the receiving sleeve 73 and that upon actuation of the actuation member 72, is displaced axially. The actuation member 72 functionwise is similar to the actuation member 35 of the attachment system 31 shown in FIGS. 3a, 3b, 4a and 4b.

The attachment system 71, in distinction from the previously described systems, has no rear engagement member. The receiving sleeve 73 is provided with two, extending outwardly, holding sections 75.1 and 75.2 which engage from below a plate 74 upon locking of the attachment system 71. In order to be able to introduce the attachment system 71 in the mounting opening of the plate 74 and to insure engagement of the holding sections 75.1 and 75.2 with the plate 74 upon rotation of the receiving sleeve 73, the holding sections 75.1 and 75.2 are formed at two opposite regions on the outer circumference of the receiving sleeve 73 at its end facing in the setting direction of the attachment system. Upon actuation of the actuation member 72, the receiving sleeve 73 is lifted, and the holding sections 75.1 and 75.2 lockingly engage from behind respective edge regions of the mounting opening of the plate 74.

Figure 8A:
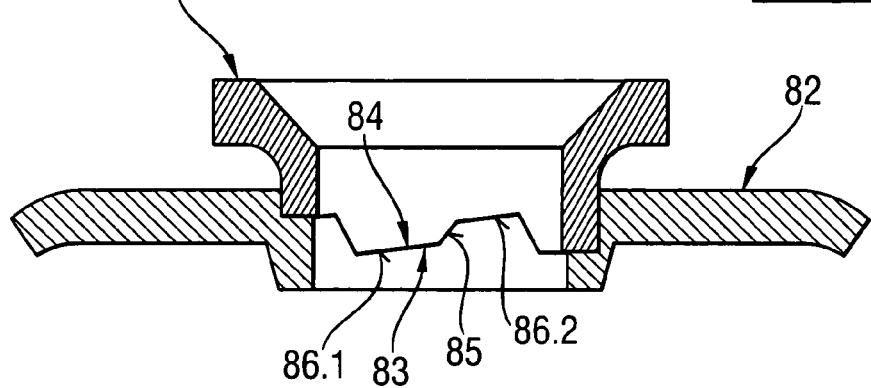
FIGS. 8a–8c cross-sectional views of actuation element and a stop of an attachment system according to the present invention in different positions.
Figure 8B:
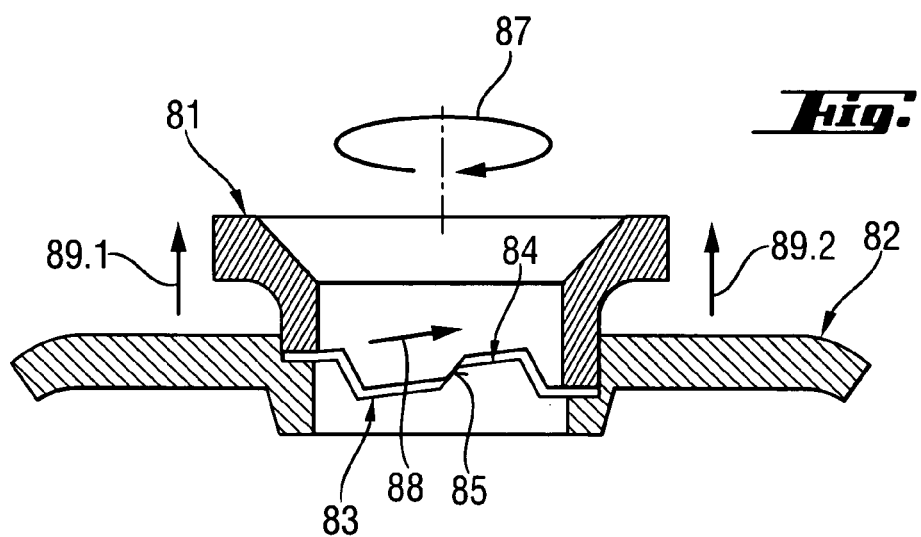
Figure 8C:
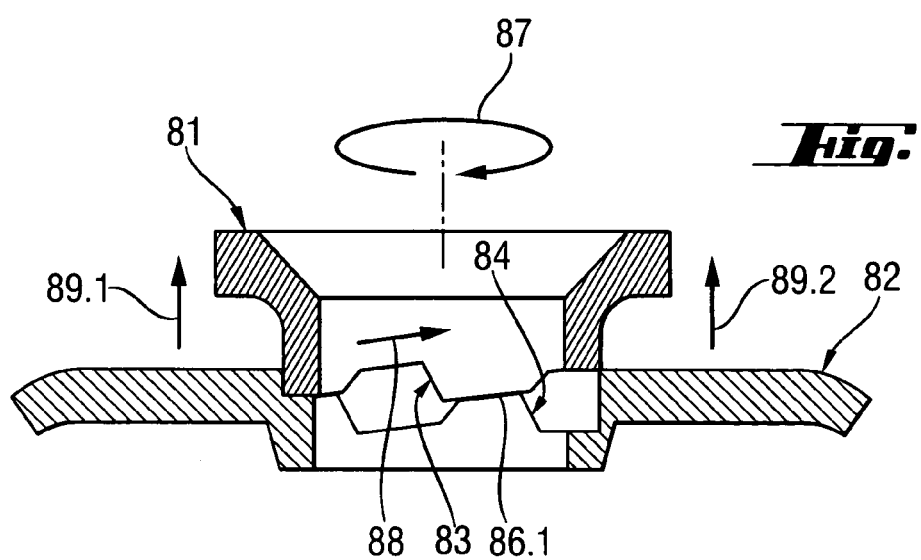

FIGS. 8a–8c show the relative positions of an actuation member and a stop having a curved profile. FIG. 8a shows relative positions of an actuation member 81 and a stop 82 in a first, receiving position of a receiving sleeve. The actuation member 81 has a curved profile 83 that cooperates with a curved profile 84 provided on the stop 82. The path necessary for displacement of engaging means of the receiving sleeve from its first position to its second, locking position is determined by the inclination angle of the section 85 of the curved profile. The sections 86.1 and 86.2 having a smaller inclination angle provide for the compensation of the thread tolerances and for locking of a rod member received in the receiving sleeve. The inclination angle of the sections 86.1 and 86.2 of the curved profile amounts, with respect to a horizontal, e.g., to less than 8°.

By rotating the actuation member 81 rightwardly, in the direction of arrow 87, the actuation member 81 is displaced from its initial position in the direction of arrow 88 and is lifted off the stop 82 in the direction shown with arrows 89.1 and 89.2, as shown in FIG. 8b. Upon further rotation of the actuation member 81 in the direction of arrow 87, the actuation member 81 is further lifted off the stop 82, and the receiving sleeve, which is connected with the stop 82, is displaced from its receiving position to its locking position, locking a rod member received therein. The less inclined sections 86.1 and 86.2 provide for application of a necessary clamping force to the rod member. The automatic release of the locking connection is prevented by self-locking of the curved profile 83 with the curved profile 84.

FIG. 9 shows a still further embodiment of the attachment system according to the present invention in its open position. In the attachment system 91 shown in FIG. 9, no axial displacement parallel to the axis of the receiving sleeve 93 takes place upon actuation of the actuation member 92. The actuation member 92 has a spiral actuation surface 94 engaging an adjusting surface 95 of the receiving sleeve 93. Upon rotation of the actuation member 92 in the direction of arrow 96 (FIG. 10), the threaded sections 98.1 and 98.2 of the receiving sleeve 93 are displaced from their first, receiving position to their second, locking position. For increasing the turnability of the actuation member 92, a sliding layer can be provided between the actuation member 92 and a constructional component 97. With this embodiment of the attachment system 91, the stop is eliminated as the actuation member is mounted directly on the constructional component 97. According to a modification of the attachment system 91, it can be provided with a stop for engaging an end surface of the constructional component 97.

FIG. 10 shows a plan view of the attachment system 91. The actuation surface 94 is formed for rotation of the actuation member 92 in the clockwise direction. When rotation of the actuation member 92 in the counter clockwise direction is desired or is necessary, the actuation surface of the actuation member 92 is formed as a mirror image of the actuation surface 94.

In summary, the attachment system according to the present invention insures a precise adjustment of a rod member, insuring at the same time a high load limits of an attachment. Upon locking of a rod member, its axial displacement is excluded. The application field of the inventive attachment system is very wide.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An attachment system for securing a rod member in a mounting opening of a constructional component (44; 74; 97), comprising a receiving sleeve (5; 37; 64; 73; 93) for receiving the rod member (23; 40) and having engagement means (24.1; 24.2; 49.1; 49.2; 69.1; 69.20; 98.1; 98.2) for engaging the rod member (23; 40); an actuation member (4; 35; 62; 72; 81; 92) connected with the receiving sleeve (5; 37; 64; 73; 93) and rotatable from a first position thereof to a second position thereof for substantially radially displacing the engagement means (24.1; 24.2; 49.1; 49.1; 69.1; 69.2; 98.1; 98.2) from a first position in which the rod member is received in the receiving sleeve (5; 37; 64; 73; 93), to a second position in which the rod member is locked in the receiving sleeve; a rear engagement member (2; 42) displaceable through the mounting opening of the constructional component (21; 44; 74; 97) for engaging the constructional component (44; 74; 97) from behind, the receiving sleeve having at an end thereof facing in a setting direction of the attachment system, at least one holding element (6; 75.1; 75.2) for engaging from behind the rear engagement member (2); and a stop (3; 32; 63; 76; 82) for engaging an end surface of the constructional component, wherein the stop (3) has a thread (15), and the actuation member (4) has a thread (14) cooperating with the stop thread (15) for axially displacing the actuation member (4).

2. An attachment system according to claim 1, wherein the actuation member (4; 35; 62; 72; 81) is displaceable parallel to the longitudinal axis of the receiving sleeve (5; 37; 64; 73).

3. An attachment system according to claim 1, wherein the rear engagement member (2) engages holding elements (22.1; 22.2) provided on the constructional component (21).

4. An attachment system according to claim 1, wherein the actuation member (4; 35; 62; 72; 81; 92) is provided with torque transmitting means.

5. An attachment system according to claim 4, wherein the actuation member (4; 35; 62; 72; 81; 92) is arranged outside of the receiving sleeve (5; 37; 64; 73; 93).

6. An attachment system according to claim 1, wherein the receiving sleeve (5; 37; 73; 93) is formed as a one-piece part and includes at least one slot (7.1; 7.2) extending in the setting direction of the attachment system (1; 31; 71; 91), and at least one springy web (81.).

7. An attachment system according to claim 6, further comprising spring means (16) for retaining the receiving sleeve (5; 37; 73; 93) in the first position of the engagement means thereof.

8. An attachment system according to claim 1, wherein the receiving sleeve is formed of at least two parts spaced by at least one slot and includes at least one spring element for connecting the parts.

9. An attachment system according to claim 8, wherein the rear engagement member has at least one locking element engageable with the at least one slot for retaining elements of the attachment system together.

10. An attachment system for securing a rod member in a mounting opening of a constructional component (44; 74; 97), comprising a receiving sleeve (5; 37; 64; 73; 93) for receiving the rod member (23; 40) and having engagement means (24.1; 24.2; 49.1; 49.2; 69.1; 69.20; 98.1; 98.2) for engaging the rod member (23; 40); an actuation member (4; 35; 62; 72; 81; 92) connected with the receiving sleeve (5; 37; 64; 73; 93) and rotatable from a first position thereof to a second position thereof for substantially radially displacing the engagement means (24.1; 24.2; 49.1; 49.1; 69.1; 69.2; 98.1; 98.2) from a first position in which the rod member is received in the receiving sleeve (5; 37; 64; 73; 93), to a second position in which the rod member is locked in the receiving sleeve; a rear engagement member (2; 42) displaceable through the mounting opening of the constructional component (21; 44; 74; 97) for engaging the constructional component (44; 74; 97) from behind, the receiving sleeve having at an end thereof facing in a setting direction of the attachment system, at least one holding element (6; 75.1; 75.2) for engaging from behind the rear engagement member (2), wherein the receiving sleeve (5; 37; 64; 73; 93) has at least one adjusting surface (11.1; 11.2; 39; 95), and the actuation member (4; 35; 72; 81; 92) has at least one actuation surface (12.1; 12,2; 36; 94) engageable with the at least one adjusting surface (11.1; 11.2; 39; 95) for inducing a substantially radial displacement of the engagement means (24.1; 24.2; 49.1; 49.2; 69.1; 69.2; 98.1; 98.2) of the receiving sleeve (5; 37; 64; 73; 93) from the first position thereof to the second position thereof, wherein at least one of the adjusting surfaces (11.1; 11.2) of the receiving sleeve (5) and the actuation surface (12.1; 12.2) of the actuation member (4) comprises an inclined surface, and wherein both the adjusting surface (11.1; 11.2) of the receiving sleeve (5) and the actuation surface (12.1; 12.2) are formed as inclined surfaces complementary to each other for converting an axial displacement of the actuation member (4) in the substantially radial displacement of the engagement means (24.1; 24.2) of the receiving sleeve (5).

* * * * *